US012176768B2

(12) United States Patent
Lim et al.

(10) Patent No.: US 12,176,768 B2
(45) Date of Patent: Dec. 24, 2024

(54) MOTOR DRIVING APPARATUS

(71) Applicants: Hyundai Motor Company, Seoul (KR); Kia Corporation, Seoul (KR); Seoul National University R&DB Foundation, Seoul (KR)

(72) Inventors: Young Seul Lim, Seoul (KR); Kang Ho Jeong, Hwaseong-si (KR); Jae Hoon Sim, Seoul (KR); Jung Ik Ha, Seoul (KR)

(73) Assignees: HYUNDAI MOTOR COMPANY, Seoul (KR); KIA CORPORATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 420 days.

(21) Appl. No.: 17/828,709

(22) Filed: May 31, 2022

(65) Prior Publication Data
US 2023/0115925 A1  Apr. 13, 2023

(30) Foreign Application Priority Data
Oct. 8, 2021 (KR) .................. 10-2021-0133556

(51) Int. Cl.
*H02M 7/5395* (2006.01)
*H02K 11/33* (2016.01)
(Continued)

(52) U.S. Cl.
CPC ............ *H02K 11/33* (2016.01); *H02M 7/537* (2013.01); *H02P 25/22* (2013.01); *H02P 27/06* (2013.01)

(58) Field of Classification Search
CPC ....... H02K 11/33; H02K 11/30; H02M 7/537; H02M 7/5395; H02M 7/48; H02M 3/155; H02M 3/335; H02M 3/33569; H02M 3/33584; H02P 25/22; H02P 25/18; H02P 25/188; H02P 27/06; H02P 27/08; H02P 27/085; H02P 21/22; H02P 4/00; H02P 29/028; H02P 8/00; H02P 6/08; H02J 7/14
See application file for complete search history.

(56) References Cited

U.S. PATENT DOCUMENTS 7,154,237 B2 * 12/2006  Welchko ............ B60L 50/51
                                                  318/400.27
7,199,535 B2 *  4/2007  Welchko ............ B60L 15/025
                                                  318/105
(Continued)

FOREIGN PATENT DOCUMENTS

JP       2014017987 A  *  1/2014  ......... B60L 11/1868
JP       6285256 B2    *  2/2018  ........ H02M 3/33584
(Continued)

*Primary Examiner* — Edgardo San Martin
(74) *Attorney, Agent, or Firm* — Morgan, Lewis & Bockius LLP

(57) ABSTRACT

A motor driving apparatus includes: a first inverter including: a plurality of first switching elements and connected to a first end of each of the windings; a second inverter including: a plurality of second switching elements and connected to a second end of each of the windings; and a controller configured to control a switching state of the plurality of first switching elements and the plurality of second switching elements based on a driving mode of the motor in one sampling period.

20 Claims, 12 Drawing Sheets

(51) Int. Cl.
*H02M 7/537* (2006.01)
*H02P 25/18* (2006.01)
*H02P 25/22* (2006.01)
*H02P 27/06* (2006.01)
*H02P 27/08* (2006.01)

(56) References Cited

U.S. PATENT DOCUMENTS

| | | | |
|---|---|---|---|
| 8,169,179 B2* | 5/2012 | Mohan | H02M 7/53873 |
| | | | 318/722 |
| 8,648,562 B2* | 2/2014 | Lipo | H02P 21/0089 |
| | | | 318/400.26 |
| 10,476,419 B2* | 11/2019 | Park | H02P 21/12 |
| 10,498,283 B2* | 12/2019 | Mitsui | H02P 6/085 |
| 11,018,614 B2* | 5/2021 | Omata | H02P 21/22 |
| 11,114,959 B2* | 9/2021 | Oka | B60L 58/12 |
| 11,128,222 B2* | 9/2021 | Itogawa | H02M 3/33573 |
| 11,258,391 B2* | 2/2022 | Saha | H02P 21/00 |
| 11,456,686 B2* | 9/2022 | Saha | H02M 7/53871 |
| 11,515,818 B2* | 11/2022 | Salem | H02P 21/20 |
| 11,784,590 B2* | 10/2023 | Bin | H02K 11/33 |
| | | | 318/400.01 |
| 11,863,095 B2* | 1/2024 | Jeong | H02P 21/22 |
| 11,870,381 B2* | 1/2024 | Reddy | B60K 17/02 |
| 11,909,342 B2* | 2/2024 | Saha | H02M 7/53871 |
| 11,979,104 B2* | 5/2024 | Saha | H02M 1/0054 |
| 2009/0033253 A1 | 2/2009 | Nagashima et al. | |
| 2024/0010076 A1* | 1/2024 | Lehn | B60L 58/40 |

FOREIGN PATENT DOCUMENTS

| | | | | |
|---|---|---|---|---|
| JP | 2019047670 A | * | 3/2019 | |
| WO | WO-2019142877 A1 | * | 7/2019 | H02M 7/501 |
| WO | WO-2020255988 A1 | * | 12/2020 | H02M 7/5387 |

* cited by examiner

FIRST INVERTER         SECOND INVERTER

FIG. 6

MOTOR DRIVING APPARATUS

CROSS REFERENCE TO RELATED APPLICATION

The present application claims priority to Korean Patent Application No. 10-2021-0133556 filed on Oct. 8, 2021, the entire contents of which is incorporated herein for all purposes by this reference.

BACKGROUND OF THE PRESENT DISCLOSURE

Field of the Present Disclosure

The present disclosure relates to a motor driving apparatus, and in particular, to a motor driving apparatus, which can switch a motor driving mode to a Y-connection motor driving mode and an open end winding motor driving mode depending upon a demand output of the motor, improving efficiency of an inverter for driving a motor.

Description of Related Art

In general, the windings of each phase included in a motor have one ends connected to one inverter and the other ends connected to each other to form a Y-connection.

When the motor is driven, as a switching element in the inverter is turned ON/OFF by a pulse width modulation control, a line voltage is applied to the windings of the Y-connected motor to generate an alternating current to generate a torque.

Because the fuel efficiency of an eco-friendly vehicle such as an electric vehicle using the torque generated by the motor as power is determined by the power conversion efficiency of the inverter-motor, it is important to maximize the power conversion efficiency of the inverter and the efficiency of the motor to improve the fuel efficiency.

The efficiency of the inverter-motor system is mainly determined by a voltage use rate of the inverter, and it is possible to improve the fuel efficiency of the vehicle if an operating point of the vehicle determined by the relationship between a speed and a torque of the motor is formed in a section where the voltage use rate is high.

However, as the number of windings of the motor is increased to increase the maximum torque of the motor, the section where the voltage use rate is high moves away from a low-torque region, which is a main operating point of the vehicle, and therefore, there can occur a problem of lowering the fuel efficiency. Furthermore, from the viewpoint of the fuel efficiency, if the vehicle is designed so that the main operating point is included in the section where the voltage use rate is high, there may be a limit to the maximum torque of the motor, causing a problem of lowering acceleration start performance of the vehicle.

Therefore, in the art, there is a demand for a motor driving technology capable of improving the efficiency of the system even while covering both low-output and high-output sections using one motor.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus, which can switch a motor driving mode to a Y-connection motor driving mode and an open end winding motor driving mode depending upon a demand output of the motor, improving efficiency of an inverter for driving a motor.

Another object of the present disclosure is to provide a motor driving apparatus including a switching pattern of a pulse width modulation control, which can maximize efficiency of an inverter when a motor is driven in an open end winding mode.

As a means for achieving the objects, the present disclosure provides a motor driving apparatus configured to drive a motor including a plurality of windings corresponding to a plurality of phases, respectively including:
 a first inverter including: a plurality of first switching elements and connected to a first end of each of the windings;
 a second inverter including: a plurality of second switching elements and connected to a second end of each of the windings; and
 a controller configured to fix a switching state of the second switching elements and switch the first switching elements in one sampling period to synthesize a voltage vector corresponding to a voltage command when the motor is driven in an open end winding mode in which the first switching elements and the second switching elements are switched in a spatial vector pulse width modulation mode, respectively, and to control the switching of the second switching elements so that the switching state of the second switching elements has the form of the left and right symmetry and the number of switchings of each phase is the same as each other in the one sampling period.

According to an exemplary embodiment of the present disclosure, the controller can synthesize the voltage vector corresponding to the voltage command in a region other than a region of a voltage vector representing that a difference between a common mode voltage of the first inverter and a common mode voltage of the second inverter is not 0 among regions of the voltage vector synthesizable by the first inverter and the second inverter when the motor is driven in the open end winding mode.

According to the exemplary embodiment of the present disclosure, the controller can fix ON/OFF states of the second switching elements for each region of a voltage vector synthesizable by the first inverter and the second inverter and switch the first switching elements to synthesize the voltage vector corresponding to the voltage command when the motor is driven in the open end winding mode.

According to the exemplary embodiment of the present disclosure, the region of the voltage vector may be six regions of an internal hexagon divided by diagonal lines of the internal hexagon in the internal hexagon that has, as a side, a line connecting the center of each side of the hexagon of a vector diagram showing the voltage vector synthesizable by the first inverter and the second inverter to the center of a neighboring side thereof.

According to the exemplary embodiment of the present disclosure, the region of the voltage vector may be six regions corresponding to six triangles connecting the center of the hexagon to a point where the switching states of the second inverter appearing on two neighboring sides of the hexagon are a same in the hexagon of a vector diagram showing the voltage vector synthesizable by the first inverter and the second inverter.

According to the exemplary embodiment of the present disclosure, the controller can fix the switching state of the second switching elements corresponding to the region where the voltage vector corresponding to the voltage command belongs and switch the first switching elements to repeat the switching state of the first switching elements in a certain pattern to synthesize a target voltage vector.

According to the exemplary embodiment of the present disclosure, the controller can fix the switching state of the second inverter as [011] in one sampling period, and control the first switching elements so that the switching state of the first inverter appears as [110], [011], and [101] in the one sampling period when the region of the voltage vector is a region where a motor electric angle ($\alpha$) corresponds to '$22\pi/12 \leq \alpha \leq 2\pi, 0 \leq \alpha \leq 2\pi/12$'.

[xyz] refers to the switching state of the inverter, in which x refers to a switching state in the inverter corresponding to a phase a of the motor, y refers to a switching state in the inverter corresponding to a phase b of the motor, and z refers to a switching state in the inverter corresponding to a phase c of the motor. x, y, z may be 1 or 0, respectively, 1 refers to a state where an upper switching elements is ON and a lower switching elements is OFF among the switching elements included in a leg of the corresponding phase, and 0 refers to a state where the upper switching elements is OFF and the lower switching elements is ON among the switching elements included in the leg of the corresponding phase.

According to the exemplary embodiment of the present disclosure, the controller can control the first switching elements so that the switching state of the first inverter appears in an order of [011], [101], [110], [011], [110], [101], and [011] in the one sampling period.

According to the exemplary embodiment of the present disclosure, the controller can fix the switching state of the second inverter as [001] in one sampling period, and control the first switching elements so that the switching state of the first inverter appears as [100], [010], and [001] in the one sampling period when the region of the voltage vector is a region where a motor electric angle ($\alpha$) corresponds to '$2\pi/12 \leq \alpha \leq 6\pi/12$'.

According to the exemplary embodiment of the present disclosure, the controller can control the first switching elements so that the switching state of the first inverter appears in an order of [001], [100], [010], [001], [010], [100], and [001] in the one sampling period.

According to the exemplary embodiment of the present disclosure, the controller can fix the switching state of the second inverter as [101] in one sampling period, and control the first switching elements so that the switching state of the first inverter appears as [110], [011], and [101] in the one sampling period when the region of the voltage vector is a region where a motor electric angle ($\alpha$) corresponds to '$6\pi/12 \leq \alpha \leq 10\pi/12$'.

According to the exemplary embodiment of the present disclosure, the controller can control the first switching elements so that the switching state of the first inverter appears in an order of [101], [110], [011], [101], [011], [110], and [101] in the one sampling period.

According to the exemplary embodiment of the present disclosure, the controller can fix the switching state of the second inverter as [100] in one sampling period, and control the first switching elements so that the switching state of the first inverter appears as [100], [010], and [001] in the one sampling period when the region of the voltage vector is a region where a motor electric angle ($\alpha$) corresponds to '$10\pi/12 \leq \alpha \leq 14\pi/12$'.

According to the exemplary embodiment of the present disclosure, the controller can control the first switching elements so that the switching state of the first inverter appears in an order of [100], [010], [001], [100], [001], [010], and [100] in the one sampling period.

According to the exemplary embodiment of the present disclosure, the controller can fix the switching state of the second inverter as [110] in one sampling period, and control the first switching elements so that the switching state of the first inverter appears as [110], [011], and [101] in the one sampling period when the region of the voltage vector is a region where a motor electric angle ($\alpha$) corresponds to '$14\pi/12 \leq \alpha \leq 18\pi/12$'.

According to the exemplary embodiment of the present disclosure, the controller can control the first switching elements so that the switching state of the first inverter appears in an order of [110], [011], [101], [110], [101], [011], and [110] in the one sampling period.

According to the exemplary embodiment of the present disclosure, the controller can fix the switching state of the second inverter as [010] in one sampling period, and control the first switching elements so that the switching state of the first inverter appears as [100], [010], and [001] in the one sampling period when the region of the voltage vector is a region where a motor electric angle ($\alpha$) corresponds to '$18\pi/12 \leq \alpha \leq 22\pi/12$'.

According to the exemplary embodiment of the present disclosure, the controller can control the first switching elements so that the switching state of the first inverter appears in an order of [010], [001], [100], [010], [100], [001], and [010] in the one sampling period.

According to the exemplary embodiment of the present disclosure, a switching loss of the first switching elements may be smaller than a switching loss of the second switching elements.

According to the exemplary embodiment of the present disclosure, the first switching elements may be a Field Effect Transistor (FET) based on a SiC material, and the second switching elements may be an IGBT based on a Si material.

According to the motor driving apparatus, it is possible to improve the efficiency in the entire torque section compared to the conventional technology of driving the general Y-connection motor using one inverter, contributing to improving in the fuel efficiency of the vehicle.

Furthermore, according to the motor driving apparatus, during the driving in the open end winding mode in which the motor is driven by simultaneously operating two inverters connected to each of both ends of the motor coil, it is possible to reduce the switching loss and improve the efficiency of the system through the clamping control, which minimizes the switching of the inverter employing the switching element having the large switching loss and allows the switching to be performed by the inverter employing the switching elements having the relatively small switching loss when the voltage vector for the spatial vector pulse width modulation is synthesized.

According to the motor driving apparatus, it is possible to provide the optimal switching pattern of the pulse width modulation control for the clamping control, maximizing the improvement in the efficiency of the system through the clamping control.

The effects which may be obtained from the present disclosure are not limited to the aforementioned effects, and other effects not mentioned may be clearly understood to those skilled in the art to which the present disclosure pertains from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6 is a diagram showing a switching example of a first inverter and a second inverter for each region shown in FIG. 5.

Figure 1:
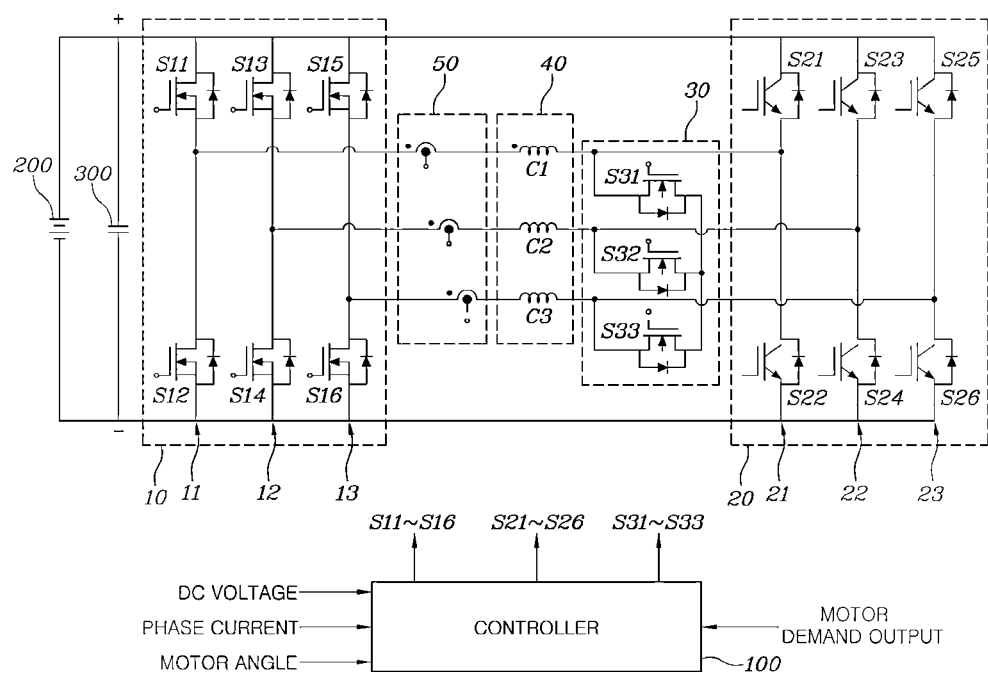
FIG. 1 is a circuit diagram of a motor driving apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a motor driving apparatus according to various exemplary embodiments of the present disclosure will be described in detail with reference to the accompanying drawings.

FIG. 1 is a circuit diagram of a motor driving apparatus according to an exemplary embodiment of the present disclosure.

Referring to FIG. 1, a motor driving apparatus according to an exemplary embodiment of the present disclosure, as the motor driving apparatus configured to supply a driving power to a motor 40 including a plurality of windings (C1 to C3) corresponding to a plurality of phases, respectively, may include a first inverter 10 including: a plurality of first switching elements (S11 to S16) and connected to a first end of each of the windings of the motor 40, a second inverter 20 including: a plurality of second switching elements (S21 to S26) and connected to a second end of each of the windings of the motor 40, a plurality of third switching elements 30 (S31 to S33) including one ends connected to a second end of each of the windings of the motor 40 and the other ends connected to each other, and a controller 100 configured to control ON/OFF states of the first switching elements (S11 to S16), the second switching elements (S21 to S26), and the third switching elements (S31 to S33) based on a demand output of the motor 40.

The first inverter 10 and the second inverter 20 can convert the DC power stored in a battery 200 into three-phase AC power to provide it to the motor 40, or convert regenerative braking energy generated by generating a regenerative braking torque of the motor 40 during regenerative braking into a direct current to provide it to the battery 200. The present conversion between the DC power and the AC power may be performed by the pulse width modulation control of the plurality of first switching elements (S11 to S16) and the plurality of second switching elements (S21 to S26) provided in the first inverter 10 and the second inverter 20, respectively.

The first inverter 10 may include: a plurality of legs (11 to 13) to which a DC voltage formed in a DC link capacitor 300 connected between both ends of the battery 200 is applied. The respective legs (11 to 13) can correspond to each of the phases of the motor 40 to form the electrical connection.

A first leg 11 includes two switching elements (S11, S12) connected in series between both ends of the DC capacitor 300, and a connection node of the two switching elements (S11, S12) may be connected to one end of a winding C1 of one phase in the motor 40 so that the AC power corresponding to one of the plurality of phases is input/output. Likewise, a second leg 12 includes two switching elements (S13, S14) connected in series between both ends of the DC capacitor 300, and a connection node of the two switching elements (S13, S14) may be connected to one end of a winding C2 of one phase in the motor 40 so that the AC power corresponding to one of the plurality of phases is input/output. Furthermore, a third leg 13 includes two switching elements (S15, S16) connected in series between both ends of the DC capacitor 300, and a connection node of the two switching elements (S15, S16) may be connected to one end of a winding C3 of one phase in the motor 40 so that the AC power corresponding to one of the plurality of phases is input/output.

The second inverter 20 can also have a configuration similar to that of the first inverter 10. The second inverter 20 may include a plurality of legs (21 to 23) to which the DC voltage formed in the DC link capacitor 300 connected between both ends of the battery 200 is applied. The respective legs (21 to 23) can correspond to each of the phases of the motor 40 to form the electrical connection.

First leg 21 includes two switching elements (S21, S22) connected in series between both ends of the DC capacitor 300, and a connection node of the two switching elements (S21, S22) may be connected to the other end of the winding C1 of one phase in the motor 40 so that the AC power corresponding to one of the plurality of phases is input/output. Likewise, a second leg 22 includes two switching elements (S23, S24) connected in series between both ends of the DC capacitor 300, and a connection node of the two switching elements (S23, S24) may be connected to the other end of the winding C2 of one phase in the motor 40 so that the AC power corresponding to one of the plurality of phases is input/output. Furthermore, a third leg 23 includes two switching elements (S25, S26) connected in series between both ends of the DC capacitor 300, and a connection node of the two switching elements (S25, S26) may be connected to one end of a winding C3 of one phase in the motor 40 so that the AC power corresponding to one of the plurality of phases is input/output.

The first inverter 10 is connected to one ends of the windings (C1 to C3) of the motor 40, and the second inverter 20 is connected to the other ends of the windings (C1 to C3) of the motor 40. In other words, both ends of the windings (C1 to C3) of the motor 40 may be formed with the electrical connection in an open end winding mode connected to the first inverter 10 and the second inverter 20, respectively.

According to the exemplary embodiment of the present disclosure, the plurality of third switching elements 30 can have one ends connected to the other end of each of the windings (C1 to C3) included in the motor 40, and the other ends connected to each other.

In the present connection structure, if the third switching element 30 is turned on, the other ends of the windings (C1 to C3) of the motor 40 form the electrical connection with each other, and therefore, the motor 40 has a Y-connected winding structure. Therefore, in the state where the plurality of third switching elements 30 are turned on, the motor 40 may be driven by inactivating the second inverter 20 (turning off all of the plurality of second switching elements (S21 to S26)) and switching only the first switching elements (S11 to S16) of the first inverter 10 through the pulse width modulation control.

If the third switching element 30 is turned off, both ends of the windings (C1 to C3) of the motor 40 become a state of being connected to the first inverter 10 and the second inverter 20, respectively. Therefore, in the state where the plurality of third switching elements 30 are turned off, the motor 40 may be driven by activating both the first inverter 10 and the second inverter 20 to switch all of the first switching elements (S11 to S16) and the second switching elements (S21 to S26) through the pulse width modulation control.

In the art, a mode in which the motor 40 is driven by turning on the third switching element 30 to connect the other ends of the windings (C1 to C3) of the motor 40 and activating only the first inverter 10 may be referred to as a closed end winding (CEW) mode or a Y-connection mode, and a mode in which the motor 40 is driven by turning off the third switching mode 30 and activating both the first inverter 10 and the second inverter 20 connected to both ends of the windings (C1 to C3) of the motor 40, respectively may be referred to as an open end winding (OEW) mode.

Various switching means known in the art, such as a MOSFET, an Insulated-Gate Bipolar Transistor (IGBT), a thyristor, and a relay, may be employed as the third switching elements (S31 to S33).

The controller 100 is basically an element of switching the switching elements (S11 to S16, S21 to S26) included in the first inverter 10 and the second inverter 20 through the pulse width modulation control so that the motor 40 may be driven based on the demand output required for the motor 40. According to various exemplary embodiments of the present disclosure, the controller 100 can determine a driving mode of the motor based on the demand output of the motor 40, determine the ON/OFF states of the third switching element 30 depending upon the mode, and switch the switching element of the converter activated depending upon the mode through the pulse width modulation control.

If the output required for the motor 40 is smaller than a preset reference value, the controller 100 does not operate the second inverter 20 and can execute the closed end winding mode in which the motor 40 is driven by performing the pulse width modulation control for the switching elements (S11 to S16) of the first inverter 10. At the instant time, the controller 100 can control the third switching elements (S31 to S33) to be in an ON state. Therefore, the other ends of the respective windings (C1 to C3) of the motor 40 may be electrically connected to each other to form the Y-connection.

The driving of the motor in the closed end winding mode may be achieved by receiving a DC voltage of the first inverter 10, a phase current provided to the motor 40 detected by a current detector 50, and a motor angle detected by a motor rotor detector provided on the motor 40 to perform the pulse width modulation control for the first switching elements (S11 to S16) of the first inverter 10 by the control unit 100. Because various techniques for driving the motor 40 by performing the pulse width modulation control for one inverter are already known in the art, further detailed description of the pulse width modulation control technique of the inverter performed in the closed end winding mode will be omitted.

Meanwhile, if the output required for the motor 40 is greater than the preset reference value, the controller 100 can drive the motor 40 in the open end winding mode by operating both the first inverter 10 and the second inverter 20. At the instant time, the controller 100 can control the third switching elements (S31 to S33) to be in an OFF state. Therefore, one ends of the respective windings (C1 to C3) of the motor 40 are connected to the first inverter 20 and the other ends thereof are connected to the second inverter 20, and the controller 100 can drive the motor 40 by performing the pulse width modulation control for the first inverter 10 and the second inverter 20 together.

The driving of the motor in the open end winding mode may be achieved by receiving the DC voltages of the first inverter 10 and the second inverter 20, the phase current provided to the motor 40 detected by the current detector 50, and the motor angle detected by the motor rotor detector provided on the motor 40 to perform the pulse width modulation control for the first switching elements (S11 to S16) of the first inverter 10 and the second switching elements (S21 to S26) of the second inverter 20 by the control unit 100.

The present disclosure relates to a new technique for driving the motor by performing the pulse width modulation control for the two inverters 10, 20 connected to both ends of the windings (C1, C2, C3) of the motor 40 when the motor is driven in the open end winding mode, and provides a technique of driving the motor in the open end winding mode, which can minimize a switching loss by minimizing the number of switchings, improving the efficiency of the inverter.

Figure 2:
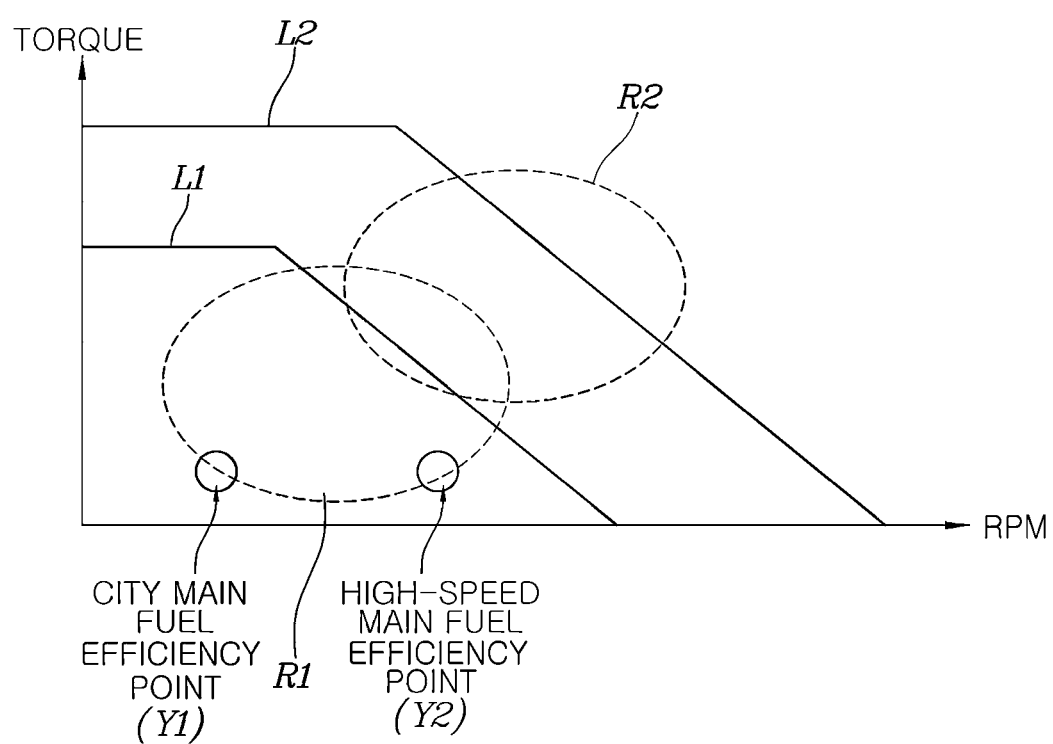
FIG. 2 is a diagram showing a rotation speed (revolutions per minute, RPM)-torque curve and a high-efficiency region for each motor driving mode of the motor driving apparatus according to the exemplary embodiment of the present disclosure.

FIG. 2 is a diagram showing a motor rotation speed (RPM)-motor torque curve and a high-efficiency region for each motor driving mode of the motor driving apparatus according to the exemplary embodiment of the present disclosure.

As described above, the motor driving apparatus according to the exemplary embodiment of the present disclosure is driven by controlling the first inverter 10 in the closed end winding mode, and driven by controlling the first inverter 10 and the second inverter 20 in the open end winding mode.

As shown in FIG. 2, if the motor 40 is applied to the driving of the vehicle, main vehicle operating points appear as an operating point (Y1) during city traveling (low-speed traveling) and an operating point (Y2) during highway traveling (high-speed traveling), and the control is performed so that these operating points (Y1, Y2) are included in a region where the efficiency of the motor-inverter system is high. In other words, if the motor 40 is applied to the vehicle, the motor 40 is driven so that the region where the efficiency of the motor-inverter system is high includes the main operating points (Y1, Y2).

In other words, since the efficiency of the motor-inverter system is determined by a voltage use rate of the inverter, the motor 40 is driven so that the main operating points (Y1, Y2) may be included in a region where it may be determined that the efficiency is excellent because the voltage use rate of the inverter is higher than a preset reference value.

In FIG. 2, a region (R1) is a region where it may be determined that the voltage use rate is excellent when the motor 40 is driven in the closed end winding mode, and a region (R2) is a region where it may be determined that the voltage use rate is excellent when the motor 40 is driven in the open end winding mode.

The open end winding mode is a mode in which an open end winding motor is driven, and it is known that in the open end winding driving, the output of the inverter may be set to be about $\sqrt{3}$ times higher than in a case where the motor of the Y-connected winding having the same number of turns is simply driven by use of one inverter. In other words, if the open end winding driving, which is the open end winding mode, is applied, it is possible to increase the number of turns of the motor by $\sqrt{3}$ times, reducing the current output for the motor to generate the same output by $\sqrt{3}$ times.

Therefore, if the open end winding driving mode is applied, it is possible to reduce the current of the inverter compared to the driving of the Y-connection motor to generate the same output, increasing the efficiency, and to reduce the amount of power semiconductor used applied as the switching element, reducing the material cost.

Meanwhile, as shown in FIG. 2, if the closed end winding mode is applied, the motor 40 may be controlled so that the main operating points (Y1, Y2) are included in the region (R1) where it may be determined that the voltage use rate of the motor-inverter system is excellent, but if the open end winding mode is applied, it is difficult to include the main operating points (Y1, Y2) in the region (R2) where it may be determined that the voltage use rate of the motor-inverter system is excellent as the output of the motor increases. Therefore, as described above, in a low-torque region where the main operating points (Y1, Y2) belong, the motor 40 is driven in the closed end winding mode, improving the efficiency, and in a section where a high output is required, the motor 40 is driven in the open end winding mode to perform an operation of relatively reducing the output current of the inverter and reducing the amount of the power semiconductor used.

Furthermore, to further improve the efficiency of the closed end winding mode performed in the low-torque region where the main operating points (Y1, Y2) belong, it is more preferable that the switching elements (S11 to S16) applied to the first inverter 10 employ a MOSFET made of SiC, which is a material having a relatively small switching loss. On the other hand, the switching elements (S21 to S26) applied to the second inverter 20 operated in the high-output region employ an IGBT made of Si, which is an inexpensive material.

As described above, the motor driving apparatuses according to various exemplary embodiments of the present disclosure can allow the main operating points of the vehicle to be included in the high-efficiency section of the motor-inverter system based on the demand output of the motor, improving the efficiency of the system and achieving the high torque with the small current of the winding in the high-output section.

Therefore, the motor driving apparatuses according to various exemplary embodiments of the present disclosure can improve the efficiency in the entire torque section compared to the conventional technology of driving the general Y-connection motor using one inverter, contributing to improving the fuel efficiency of the vehicle.

Meanwhile, in the open end winding mode, that is, the mode in which the open end winding motor is driven by opening all of the third switching elements (S31 to S33) and simultaneously operating the first inverter 10 and the second inverter 20, the second switching elements (S21 to S26) included in the second inverter 20 may be made of Si, etc. having a large switching loss, reducing the entire motor driving efficiency, and the sizes of the second switching elements (S21 to S26) are required to be increased to drive the same current as those of the first switching elements (S11 to S16) of the first inverter 10 made of SiC, etc., causing the increase in the material cost.

Therefore, there is a demand for a control technique capable of reducing the switching loss caused by the second switching elements (S21 to S26) to increase efficiency and implementing the open end winding mode without increasing the sizes of the second switching elements (S21 to S26).

Hereinafter, the mode in which the motor 40 is driven as the open end winding motor by opening all of the third switching elements (S31 to S33) and simultaneously operating the first inverter 10 and the second inverter 20 will be described in more detail.

Figure 3:
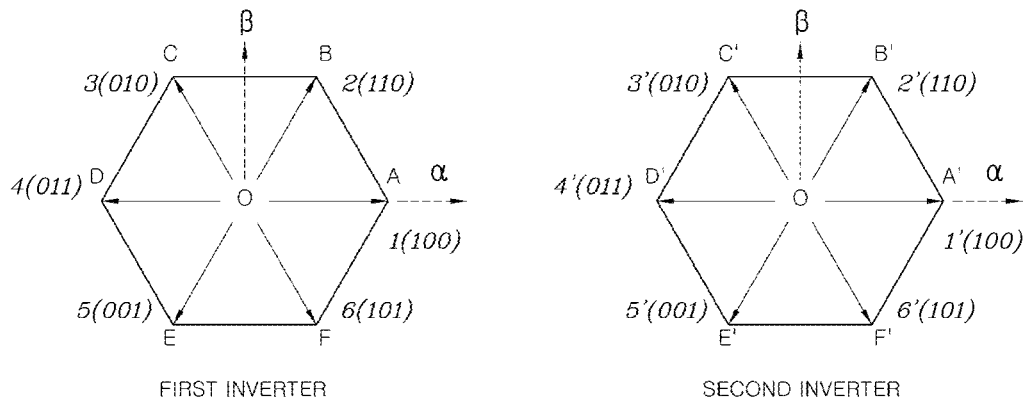
FIG. 3 is a diagram showing a voltage vector synthesized by two inverters applied to an open end winding motor.
Figure 4:
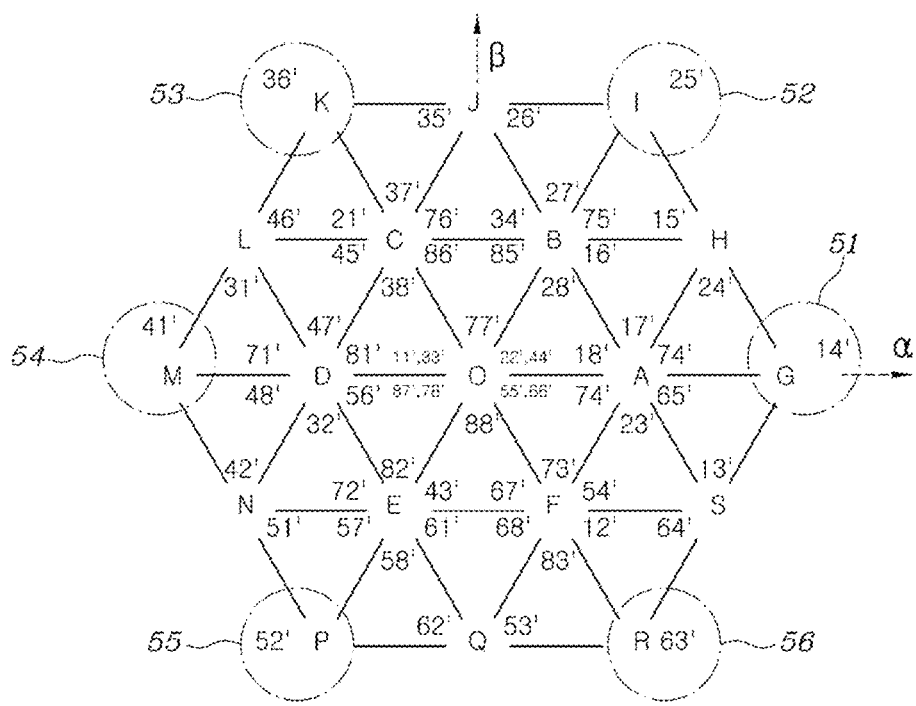
FIG. 4 is a diagram showing a voltage vector synthesized by two inverters when the motor is driven in an open end winding mode.

FIG. 3 is a diagram showing a voltage vector synthesized by two inverters applied to an open end winding motor, and FIG. 4 is a diagram showing a voltage vector synthesized by two inverters when the motor is driven in an open end winding mode.

In the circuit structure shown in FIG. 1, the first inverter 10 and the second inverter 20 include a pair of switching elements (a pair of S11 and S12, a pair of S13 and S14, a pair of S15 and S16, a pair of S21 and S22, a pair of S23 and S24, and a pair of S25 and S26) in a leg corresponding to each phase of the motor, and the switching elements of each leg may be complementarily operated.

In the vector diagram shown in FIG. 3, the vertices and origins of the hexagon represent voltage vectors depending upon the states of the switching elements of each inverter. For example, a point indicated by an index A represents a voltage vector of [100] of the first inverter 10. Here, [100] means a state where an upper switching element S11 of the switching elements (S11, S12) included in a leg corresponding to a phase one of the first inverter is ON, and upper switching elements (S13, S15) among the switching elements included in a leg corresponding to the remaining phase are OFF.

Furthermore, the center of the hexagon corresponds to a vector [000] or [111], which means that all of the upper switches of each leg of the inverter are OFF or ON.

As shown in FIG. 3, a total of eight voltage vectors which may be synthesized by each inverter may be obtained by combining the ON/OFF states of six switching elements.

If all of the third switching elements 30 are turned off and the motor 40 is driven in the open end winding mode, a structure in which each leg of the first inverter 10 and the second inverter 20 is connected to both ends of the motor coil corresponding to each phase of the motor 40 is formed, and therefore, a phase voltage of each phase applied to the motor is applied as a difference of the phase voltages between the first inverter and the second inverter. Furthermore, because each of the first inverter 10 and the second inverter 20 is independently controlled, the voltage vector actually applied to the motor may include a total of 64 voltage vectors by combining eight voltage vectors which may be synthesized by the first inverter 10 and eight voltage vectors which may be synthesized by the second inverter 20, as shown in FIG. 4.

Meanwhile, a common mode voltage in each of the inverters 10, 20 may be defined as a value obtained by dividing the sum of the phase voltages of each phase by 3, and a voltage vector in which a difference between the common mode voltages of the two inverters is not 0 is not used in the driving of the motor when the motor is driven in the open end winding mode. This is because the flow of the current generated by the difference between the common mode voltages of the two inverters 10, 20 causes the loss of the motor.

Voltage vectors indicated by reference numerals '51' to '56' in FIG. 4 are voltage vectors in which the difference between the common mode voltages of the two inverters is not 0.

For example, in an OS vector (13' vector) in FIG. 4, the switching state of the first inverter is [100] and the switching state of the second inverter is [010], and therefore, the common mode voltage of the first inverter may be determined as "{(Vdc/2)+0+0}/3=Vdc/6," and the common mode voltage of the second inverter may be determined as "{0+(Vdc/2)+0}/3=Vdc/6." Therefore, the difference between the two common mode voltages becomes 0.

On the other hand, in an OG vector (14' vector) in FIG. 4, the switching state of the first inverter is [100] and the switching state of the second inverter is [011], and therefore, the common mode voltage of the first inverter may be determined as "{(Vdc/2)+0+0}/3=Vdc/6," and the common mode voltage of the second inverter may be determined as "{0+(Vdc/2)+(Vdc/2)}/3=Vdc/3." Therefore, the difference between the two common mode voltages becomes "−Vdc/6".

Here, Vdc may be an DC input voltage of the inverter, that is, a voltage of the battery 200.

When the difference between the common mode voltages of the two inverters is determined in the same manner as in the above example, it may be confirmed that the voltage vectors indicated by 51' to '56' in FIG. 4 are the voltage vectors in which the difference between the common mode voltages of the two inverters is not 0.

Figure 5:
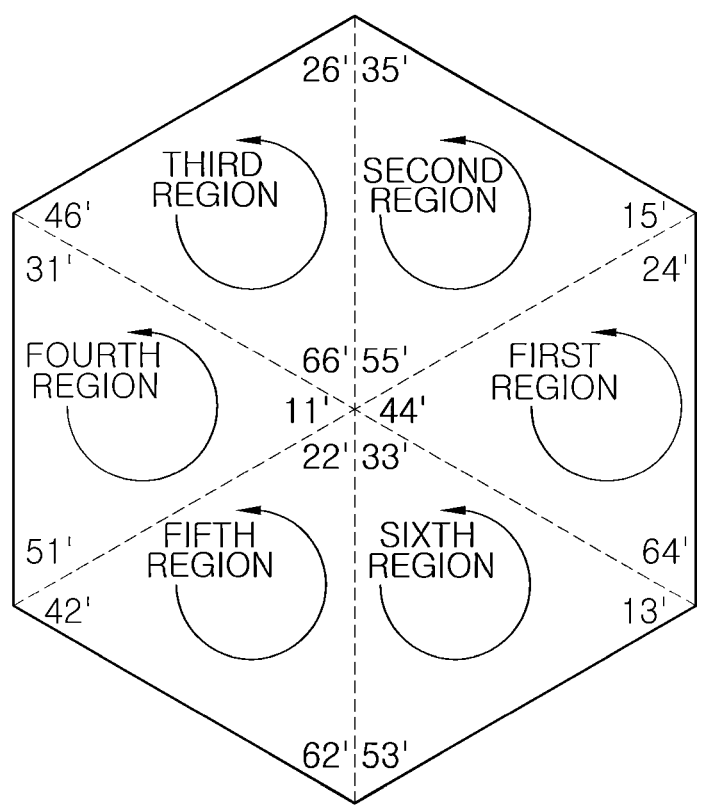
FIG. 5 is a vector diagram schematically showing the remaining voltage vector except for the voltage vector that causes a difference between common mode voltages of two inverters from the vector diagram shown in FIG. 4.

FIG. 5 is a vector diagram schematically showing the remaining voltage vector excluding the voltage vector that generates a common mode voltage difference between two inverters from the vector diagram shown in FIG. 4.

As shown in FIG. 5, a hexagon may be formed when the available synthesized voltage vectors are connected to each other except for the voltage vector that causes the difference between the common mode voltages of the two inverters. According to the exemplary embodiment of the present disclosure, the controller 100 can generate a voltage command corresponding to the demand output of the motor input from the outside, and synthesize a voltage command vector corresponding to the voltage command within the hexagonal region shown in FIG. 5.

The hexagon shown in FIG. 5 can have a hexagonal shape that has, as a side, a line connecting the center of each side of the hexagon to the center of the neighboring side in the hexagon of FIG. 4 showing the voltage vector diagram which may be applied when the first inverter 10 and the second inverter 20 are simultaneously driven.

In the hexagon shown in FIG. 5, it may be confirmed that when looking at the voltage vectors corresponding to vertices of six regions divided by diagonal lines of the hexagon, that is, the respective regions appearing as a triangle, the switching states of the second inverter are the same as each other, and the switching state of the first inverter may be changed into three. In other words, in each of the six regions, a voltage vector within the corresponding region may be synthesized by fixing the switching state of the second inverter and changing only the switching state of the first inverter. The present switching control may be performed every one sampling period of the controller 100.

For example, a first region shown in FIG. 5 is a region where a motor electric angle (a) corresponds to '$22\pi/12 \leq \alpha \leq 2\pi, 0 \leq \alpha \leq 2\pi/12$', and the switching state of the second inverter may be implemented as 4', that is, [011].

Furthermore, a second region is a region where the motor electric angle ($\alpha$) corresponds to '$2\pi/12 \leq \alpha < 6\pi/12$', and the switching state of the second inverter may be implemented as 5', that is, [001].

Furthermore, a third region is a region where the motor electric angle ($\alpha$) corresponds to '$6\pi/12 \leq \alpha < 10\pi/12$', and the switching state of the second inverter may be implemented as 6', that is, [101].

Furthermore, a fourth region is a region where the motor electric angle ($\alpha$) corresponds to '$10\pi/12 \leq \alpha < 14\pi/12$', and the switching state of the second inverter may be implemented as 1', that is, [100].

Furthermore, a fifth region is a region where the motor electric angle ($\alpha$) corresponds to '$14\pi/12 \leq \alpha < 18\pi/12$', and the switching state of the second inverter may be implemented as 2', that is, [110].

Furthermore, a sixth region is a region where the motor electric angle ($\alpha$) corresponds to '$18\pi/12 \leq \alpha < 22\pi/12$', and the switching state of the second inverter may be implemented as 3', that is, [010].

In consideration of the present point, according to the exemplary embodiment of the present disclosure, to minimize the switching loss of the second inverter 20 using the switching element made of Si including the large switching loss, a desired voltage vector is synthesized by controlling the switching element of the second inverter to continuously maintain the switching state corresponding to the corresponding region for each region, and switching the switching element of the first inverter 10. As described above, a control technique of controlling the switching element of the second inverter 20 to continuously maintain the switching state determined for each of the regions divided depending upon the motor electric angle, and switching the switching element of the first inverter 10 may be referred to as a clamping control.

Through the present clamping control, according to the exemplary embodiment of the present disclosure, it is possible to maximally suppress the switching of the switching element having the large switching loss to minimize the switching loss, improving the efficiency of the system.

Figure 6:
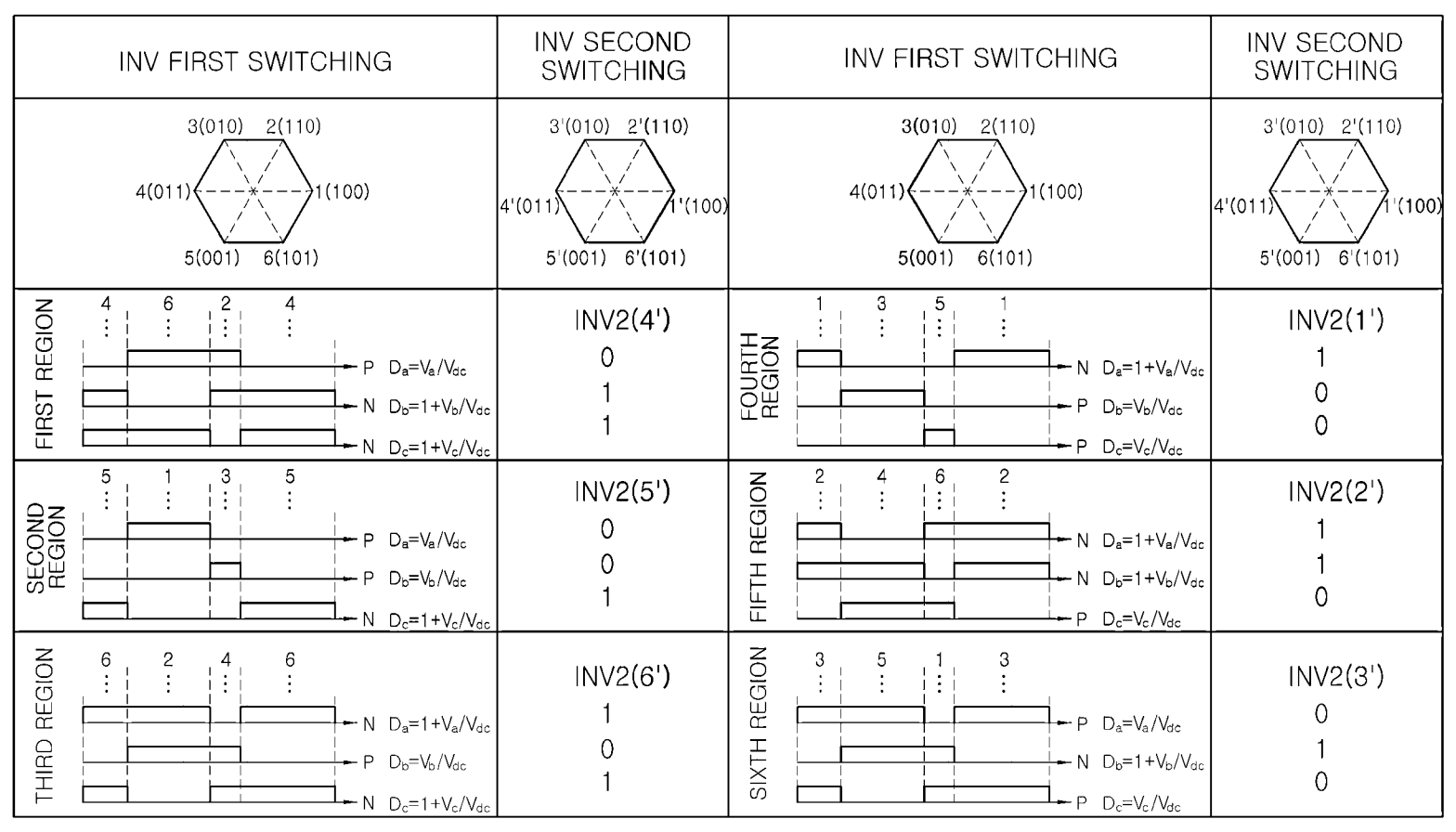

FIG. 6 is a diagram showing a switching example of the first inverter and the second inverter for each region shown in FIG. 5.

Referring to FIG. 6, if the voltage vector is to be synthesized in the first region of FIG. 5 during spatial vector pulse width modulation for driving the motor 40, a desired voltage vector may be synthesized by controlling the switching element in the second inverter (INV2) to maintain the state [011], which is a switching state corresponding to 4', and switching the switching element in the first inverter (INV1) to output the switching states corresponding to 2, 4, 6. A switching duty of each phase in the first inverter may be appropriately adjusted depending upon the position of the voltage to be synthesized.

Similarly, if the voltage vector is to be synthesized in the second region of FIG. 5 during spatial vector pulse width modulation for driving the motor 40, a desired voltage vector may be synthesized by controlling the switching element in the second inverter (INV2) to maintain the state [001], which is a switching state corresponding to 5', and switching the switching element in the first inverter (INV1) to output the switching states corresponding to 1, 3, 5.

Likewise, if the voltage vector is to be synthesized in the third region of FIG. 5 during spatial vector pulse width modulation for driving the motor 40, a desired voltage vector may be synthesized by controlling the switching element in the second inverter (INV2) to maintain the state [101], which is a switching state corresponding to 6', and switching the switching element in the first inverter (INV1) to output the switching states corresponding to 2, 4, 6.

If the voltage vector is to be synthesized in the fourth region of FIG. 5 during spatial vector pulse width modulation for driving the motor 40, a desired voltage vector may be synthesized by controlling the switching element in the second inverter (INV2) to maintain the state [100], which is a switching state corresponding to 1', and switching the switching element in the first inverter (INV1) to output the switching states corresponding to 1, 3, 5.

If the voltage vector is to be synthesized in the fifth region of FIG. 5 during spatial vector pulse width modulation for driving the motor 40, a desired voltage vector may be synthesized by controlling the switching element in the second inverter (INV2) to maintain the state [110], which is a switching state corresponding to 2', and switching the switching element in the first inverter (INV1) to output the switching states corresponding to 2, 4, 6.

If the voltage vector is to be synthesized in the fourth region of FIG. 5 during spatial vector pulse width modulation for driving the motor 40, a desired voltage vector may be synthesized by controlling the switching element in the second inverter (INV2) to maintain the state [100], which is a switching state corresponding to 1', and switching the switching element in the first inverter (INV1) to output the switching states corresponding to 1, 3, 5.

Figure 7:
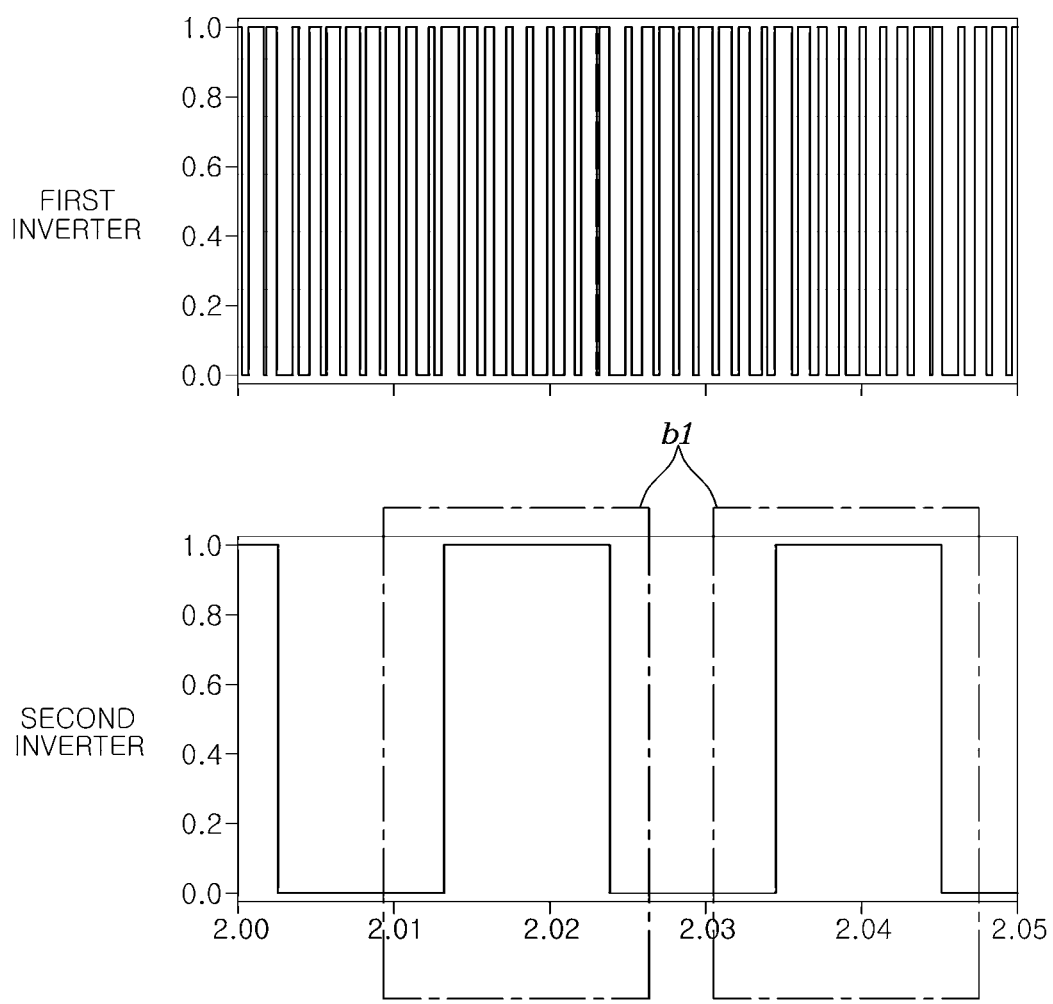
FIG. 7 is a diagram showing a switching state of a switching element in the first inverter and a switching state of a switching element in the second inverter according to the exemplary embodiment of the present disclosure.
Figure 8:
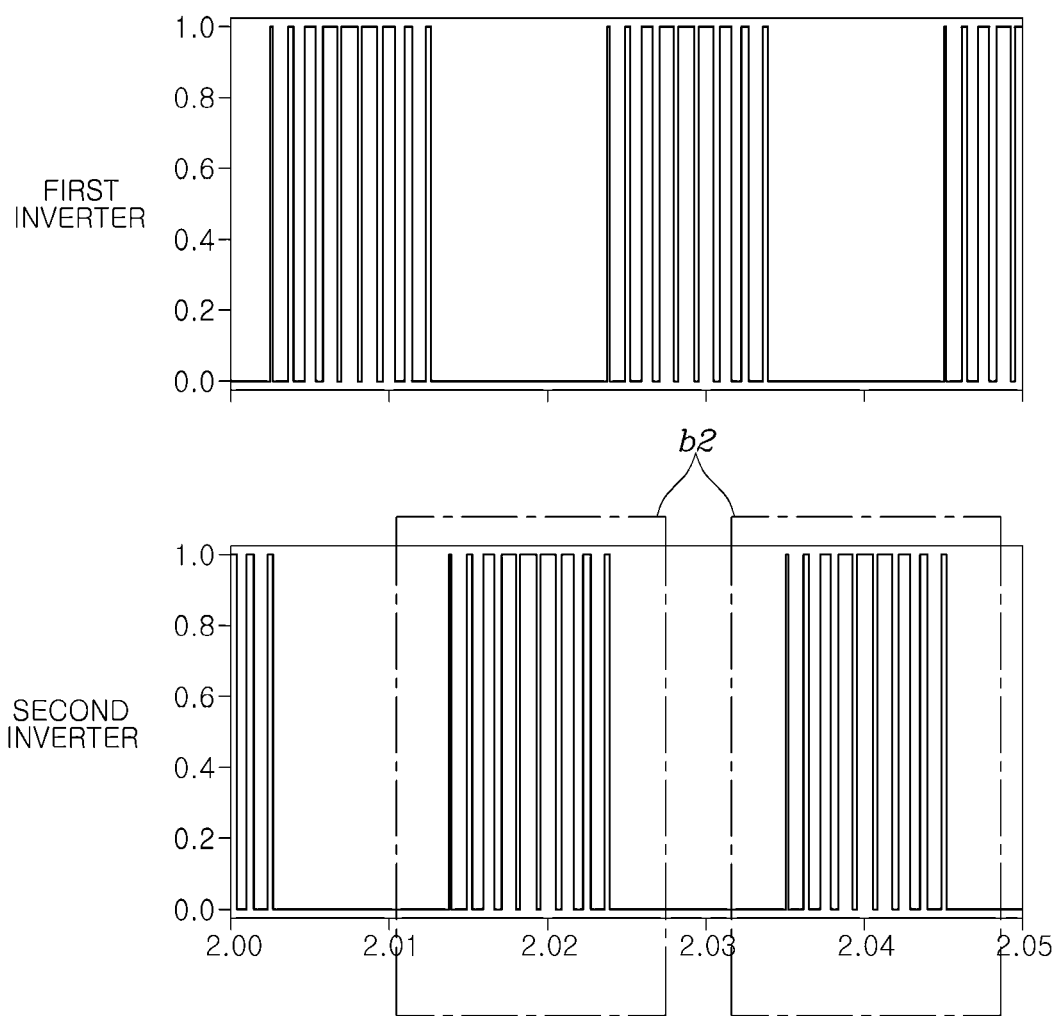
FIG. 8 is a diagram showing a switching state of the switching element in the first inverter and the switching state of the switching element in the second inverter when a motor is driven in a conventional open end winding mode.

FIG. 7 is a diagram showing a switching state of a switching element in the first inverter and a switching state of a switching element in the second inverter according to the exemplary embodiment of the present disclosure. FIG. 8 is a diagram showing a switching state of the switching element in the first inverter and the switching state of the switching element in the second inverter when a motor is driven in the conventional open end winding mode.

As shown in FIG. 7, it may be confirmed that the switching of the second inverter is significantly reduced according to the exemplary embodiment of the present disclosure. This may be confirmed more clearly by looking at the switching state when the motor is driven in the conventional open end winding mode of FIG. 8.

As shown in FIG. 8, in the driving of the motor in the conventional open end winding mode, the switching element in the second inverter also has a high-speed switching section (b2). If the second inverter is implemented as a switching element having the large switching loss, such as the switching element employing a Si material, the switching loss caused by the switching of the second inverter can greatly increase, lowering the overall efficiency of the system.

On the other hand, according to the exemplary embodiment of the present disclosure, as shown in 'b1', which is a region corresponding to the 'b2' of FIG. 8, it is possible to minimize the switching of the second inverter that employs the switching element having the large switching loss, and to drive the first inverter having the switching element made of SiC, etc. having the relatively small switching loss, improving the overall efficiency of the system.

Figure 9:
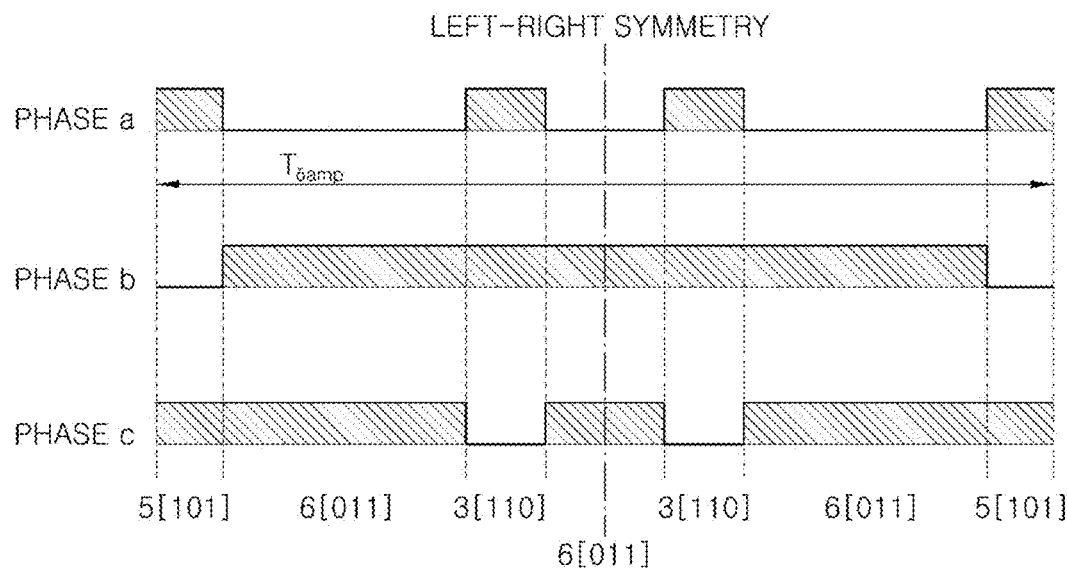
FIG. 9 and FIG. 10 show examples of switching waveforms of the first inverter which may be implemented by the motor driving apparatus according to the exemplary embodiment of the present disclosure in the first region of FIG. 6.
Figure 10:
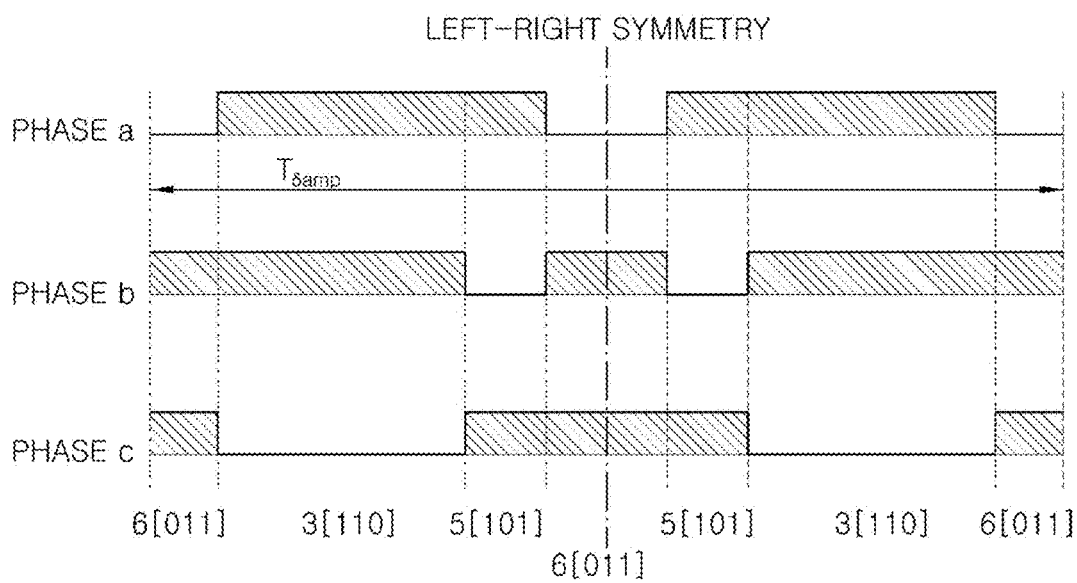
Figure 11:
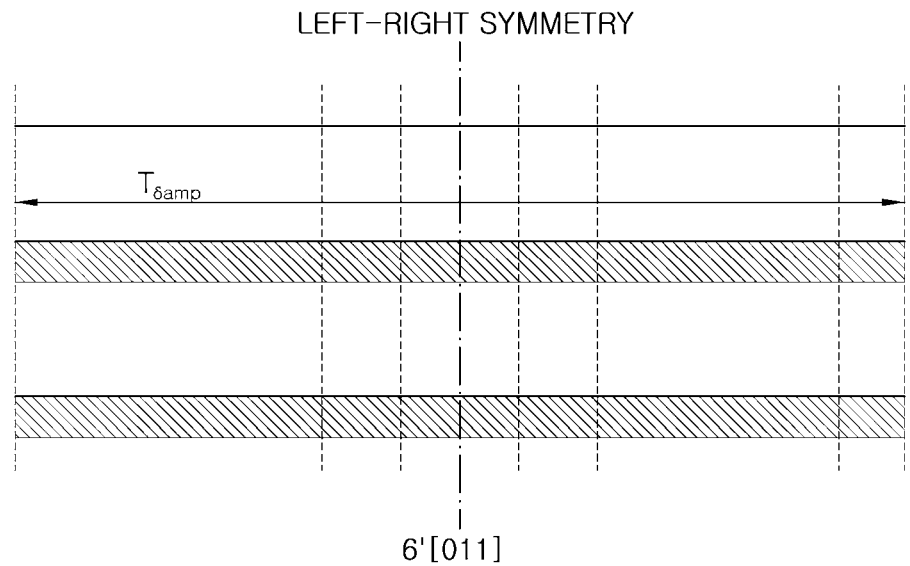
FIG. 11 shows switching waveforms of the second inverter which may be implemented by the motor driving apparatus according to the exemplary embodiment of the present disclosure in the first region of FIG. 6.
Figure 12:
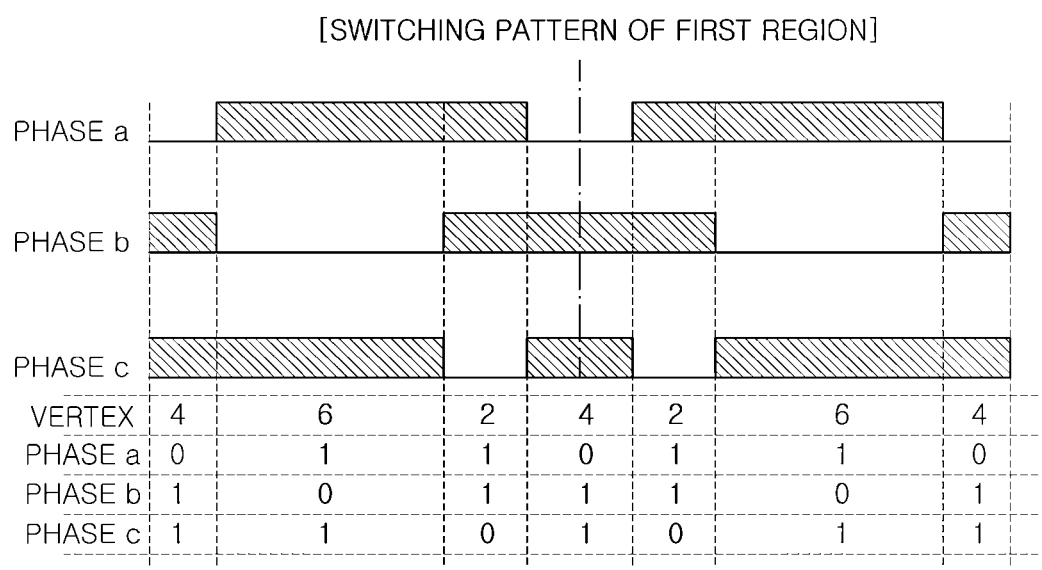
FIG. 12, FIG. 13, FIG. 14, FIG. 15, FIG. 16 and FIG. 17 are diagrams showing the switching waveforms of the first inverter during one sampling period in each region of the clamping control shown in FIG. 5 and FIG. 6.
Figure 13:
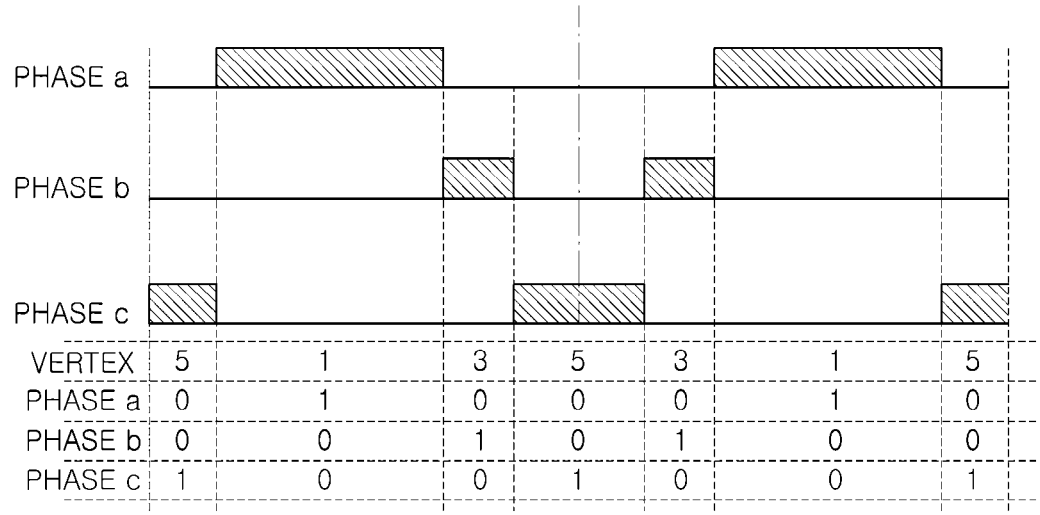
Figure 14:
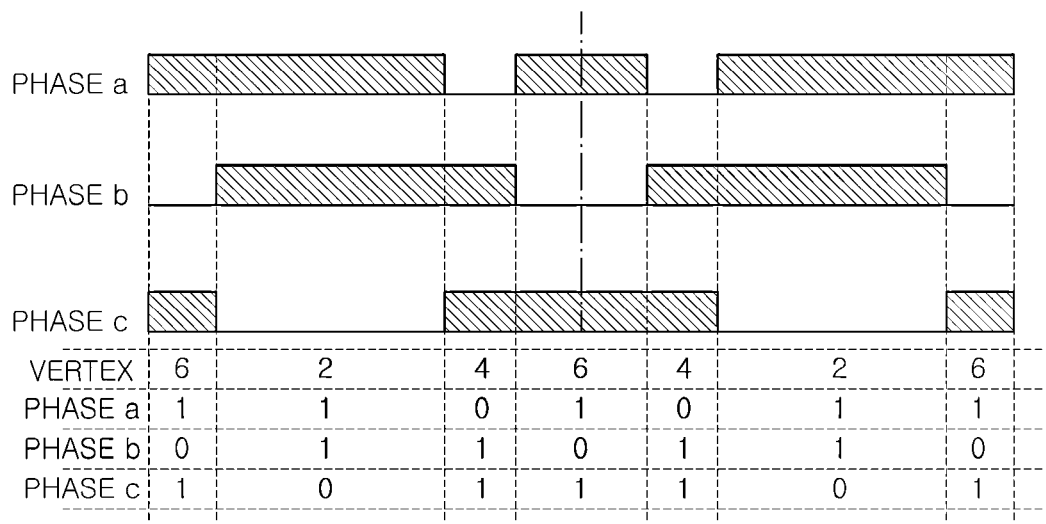
Figure 15:
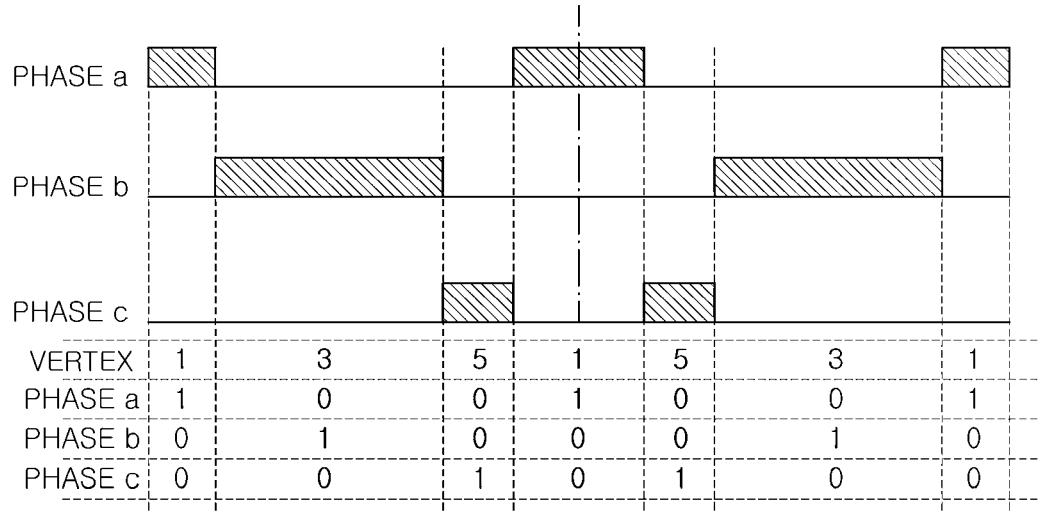
Figure 16:
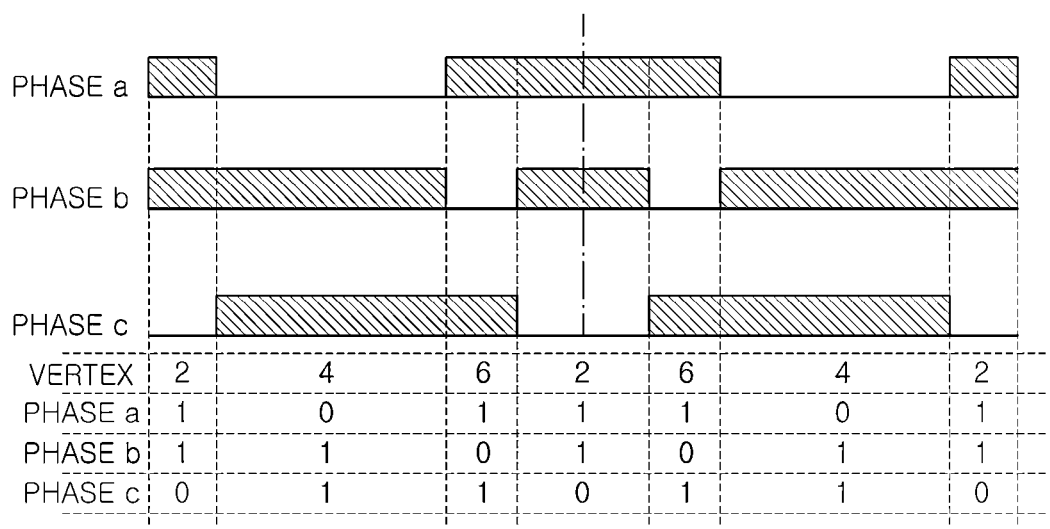
Figure 17:
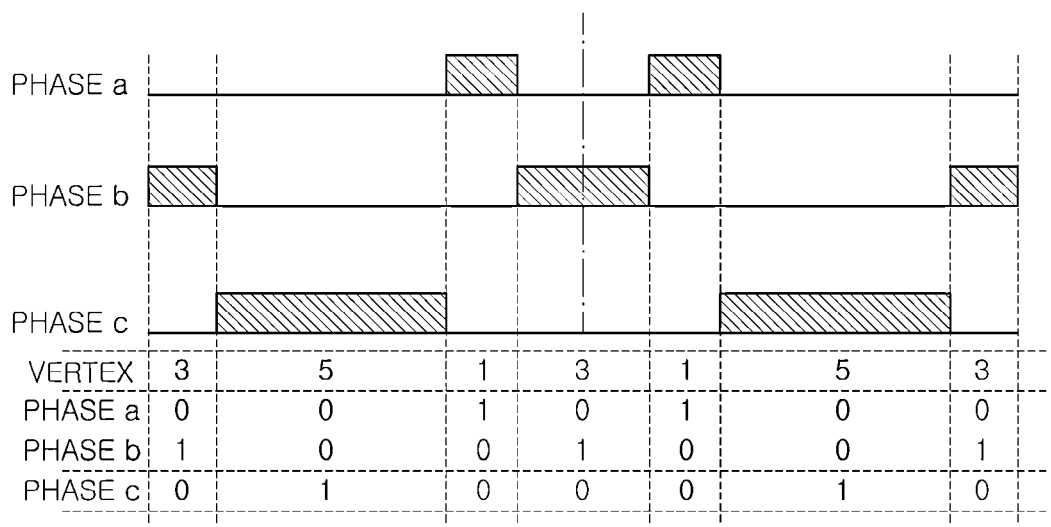

FIG. 9 and FIG. 10 show examples of switching waveforms of the first inverter which may be implemented by the motor driving apparatus according to the exemplary embodiment of the present disclosure in the first region of FIG. 6, and FIG. 11 shows switching waveforms of the second inverter which may be implemented by the motor driving apparatus according to the exemplary embodiment of the present disclosure in the first region of FIG. 6.

As described above, the first region is a region where the motor electric angle ($\alpha$) corresponds to '$22\pi/12 \le \alpha < 2\pi$, $0 \le \alpha < 2\pi/12$', and during the clamping control, the switching state of the second inverter may be implemented as 4', that is, [011], and for the switching state of the first inverter, the switching may be performed between [010], [011], and [101], which are the switching states corresponding to the vertices 2, 4, 6 of the hexagon of FIG. 3. FIG. 11 shows that the switching state of the second inverter 20 is maintained as [011].

FIG. 9 shows an example of controlling the first inverter so that the voltage vector of the first inverter 10 sequentially represents the switching states corresponding to the vertices 6, 4, 2, 4, 2, 4, 6 of the hexagon in the one-time sampling period (Tsamp), and FIG. 10 shows an example of controlling the first inverter so that the voltage vector of the first inverter 10 sequentially represents the switching states corresponding to the vertices 4, 2, 6, 4, 6, 2, 4 of the hexagon in the one-time sampling period (Tsamp). FIG. 9 and FIG. 10 all show examples in which the waveforms are represented in a form of the left and right symmetry with respect to the central time point of the sampling period (Tsamp) in one sampling period (Tsamp).

In the example shown in FIG. 9, a total of 6 switchings occur for the phase a, a total of 2 switchings occur for the phase b, and a total of 4 switchings occur for the phase c. On the other hand, in the example shown in FIG. 10, a total of 4 switchings occur for all of the phase a, the phase b, and the phase c.

In addition to the examples shown in FIG. 9 and FIG. 10, various types of switching patterns may be generated. However, as shown in FIG. 10, it is possible to implement the pulse width modulation having the switching patterns that can have the form of the left and right symmetry with respect to the center time point of one sampling period and have the number of switchings of the switching elements of each phase equally formed in one sampling period by appropriately disposing three switching states appearing in the first inverter 10 during the clamping control in the each switching region.

FIG. 12, FIG. 13, FIG. 14, FIG. 15, FIG. 16 and FIG. 17 are diagrams showing the switching waveforms of the first inverter during one sampling period in each region of the clamping control shown in FIG. 5 and FIG. 6.

FIG. 12, FIG. 13, FIG. 14, FIG. 15, FIG. 16 and FIG. 17 show the switching patterns, which can have the form of the left and right symmetry and have the number of switchings of each phase equally formed in one switching period among the switching waveforms of the first inverter 10 that can appear in each of the first region to the sixth region shown in and described with reference to FIG. 5 and FIG. 6.

If the switching patterns are determined as shown in FIGS. 12 to 17, the switching patterns can have the form of the left and right symmetry and have the number of switchings of each phase equally formed in one switching period, easily implementing the pulse width modulation and preventing an excessive load from being accumulated in the switching element of a specific phase.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus to drive a motor including a plurality of windings corresponding to a plurality of phases, respectively, the motor driving apparatus comprising:
   a first inverter including a plurality of first switching elements and connected to a first end of each of the windings;
   a second inverter including a plurality of second switching elements and connected to a second end of each of the windings; and
   a controller configured to fix a switching state of the second switching elements and switch the first switching elements in one sampling period to synthesize a voltage vector corresponding to a voltage command when the motor is driven in an open end winding mode in which the first switching elements and the second switching elements are switched in a spatial vector pulse width modulation mode, respectively, and to control the switching of the second switching elements so that the switching state of the second switching elements has a form of a left and right symmetry and a number of switchings of each phase are a same as each other in the one sampling period.

2. The motor driving apparatus of claim 1, wherein the controller is configured to synthesize the voltage vector corresponding to the voltage command in a region other than a region of a voltage vector representing that a difference between a common mode voltage of the first inverter and a common mode voltage of the second inverter is not 0 among regions of the voltage vector synthesizable by the first inverter and the second inverter when the motor is driven in the open end winding mode.

3. The motor driving apparatus of claim 1, wherein the controller is configured to fix ON/OFF states of the second switching elements for each region of a voltage vector synthesizable by the first inverter and the second inverter and switches the first switching elements to synthesize the voltage vector corresponding to the voltage command when the motor is driven in the open end winding mode.

4. The motor driving apparatus of claim 3, wherein the region of the voltage vector is six regions of an internal hexagon divided by diagonal lines of the internal hexagon in the internal hexagon that has, as a side, a line connecting the center of each side of the hexagon of a vector diagram showing the voltage vector synthesizable by the first inverter and the second inverter to the center of a neighboring side thereof.

5. The motor driving apparatus of claim 3, wherein the region of the voltage vector is six regions corresponding to six triangles connecting the center of a hexagon to a point where the switching states of the second inverter appearing on two neighboring sides of the hexagon are a same in the hexagon of a vector diagram showing the voltage vector synthesizable by the first inverter and the second inverter.

6. The motor driving apparatus of claim 3, wherein the controller is configured to fix the switching state of the second switching elements corresponding to the region where the voltage vector corresponding to the voltage command belongs and switches the first switching elements to repeat a switching state of the first switching elements in a predetermined pattern to synthesize a target voltage vector.

7. The motor driving apparatus of claim 3, wherein the controller is configured to fix the switching state of the second inverter as [011] in one sampling period, and configured to control the first switching elements so that a switching state of the first inverter appears as [110], [011], and [101] in the one sampling period when the region of the voltage vector is a region where a motor electric angle (α) corresponds to ' $22\pi/12 \leq \alpha < 2\pi$, $0 \leq \alpha < 2\pi/12$',
wherein in [xyz], x refers to a switching state in the inverter corresponding to a phase one of the motor, y refers to a switching state in the inverter corresponding to a phase b of the motor, z refers to a switching state in the inverter corresponding to a phase c of the motor, x, y, z are 1 or 0, respectively, 1 refers to a state where an upper switching element is ON and a lower switching element is OFF among the switching elements comprised in a leg of the corresponding phase, and 0 refers to a state where the upper switching element is OFF and the lower switching element is ON among the switching elements comprised in the leg of the corresponding phase.

8. The motor driving apparatus of claim 7, wherein the controller is configured to control the first switching elements so that the switching state of the first inverter appears in an order of [011], [101], [110], [011], [110], [101], and [011] in the one sampling period.

9. The motor driving apparatus of claim 3, wherein the controller is configured to fix the switching state of the second inverter as [001] in one sampling period, and configured to control the first switching elements so that a switching state of the first inverter appears as [100], [010], and [001] in the one sampling period when the region of the voltage vector is a region where a motor electric angle (α) corresponds to '2 $\pi/12 \leq \alpha < 6 \pi/12$',
wherein in [xyz], x refers to a switching state in the inverter corresponding to a phase one of the motor, y refers to a switching state in the inverter corresponding to a phase b of the motor, z refers to a switching state in the inverter corresponding to a phase c of the motor, x, y, z are 1 or 0, respectively, 1 refers to a state where an upper switching element is ON and a lower switching element is OFF among the switching elements comprised in a leg of the corresponding phase, and 0 refers to a state where the upper switching element is OFF and the lower switching element is ON among the switching elements comprised in the leg of the corresponding phase.

10. The motor driving apparatus of claim 9, wherein the controller is configured to control the first switching elements so that the switching state of the first inverter appears in an order of [001], [100], [010], [001], [010], [100], and [001] in the one sampling period.

11. The motor driving apparatus of claim 3, wherein the controller is configured to fix the switching state of the second inverter as [101] in one sampling period, and configured to control the first switching elements so that a switching state of the first inverter appears as [110], [011], and [101] in the one sampling period when the region of the voltage vector is a region where a motor electric angle (α) corresponds to '$6\pi/12 \leq \alpha < 10\pi/12$',
wherein in [xyz], x refers to a switching state in the inverter corresponding to a phase one of the motor, y refers to a switching state in the inverter corresponding to a phase b of the motor, z refers to a switching state in the inverter corresponding to a phase c of the motor, x, y, z are 1 or 0, respectively, 1 refers to a state where an upper switching element is ON and a lower switching element is OFF among the switching elements comprised in a leg of the corresponding phase, and 0 refers to a state where the upper switching element is OFF and the lower switching element is ON among the switching elements comprised in the leg of the corresponding phase.

12. The motor driving apparatus of claim 11, wherein the controller is configured to control the first switching elements so that the switching state of the first inverter appears in an order of [101], [110], [011], [101], [011], [110], and [101] in the one sampling period.

13. The motor driving apparatus of claim 3, wherein the controller is configured to fix the switching state of the second inverter as [100] in one sampling period, and configured to control the first switching elements so that a switching state of the first inverter appears as [100], [010], and [001] in the one sampling period when the region of the voltage vector is a region where a motor electric angle (α) corresponds to '$10\pi/12 \leq \alpha < 14\pi/12$',
wherein in [xyz], x refers to a switching state in the inverter corresponding to a phase one of the motor, y refers to a switching state in the inverter corresponding to a phase b of the motor, z refers to a switching state in the inverter corresponding to a phase c of the motor, x, y, z are 1 or 0, respectively, 1 refers to a state where an upper switching element is ON and a lower switching element is OFF among the switching elements comprised in a leg of the corresponding phase, and 0 refers to a state where the upper switching element is OFF and the lower switching element is ON among the switching elements comprised in the leg of the corresponding phase.

14. The motor driving apparatus of claim 13, wherein the controller is configured to control the first switching elements so that the switching state of the first inverter appears in an order of [100], [010], [001], [100], [001], [010], and [100] in the one sampling period.

15. The motor driving apparatus of claim 3, wherein the controller is configured to fix the switching state of the second inverter as [110] in one sampling period, and configured to control the first switching elements so that a switching state of the first inverter appears as [110], [011], and [101] in the one sampling period when the region of the voltage vector is a region where a motor electric angle ($\alpha$) corresponds to '$14\pi/12 \leq \alpha < 18\pi/12$', wherein in [xyz], x refers to a switching state in the inverter corresponding to a phase one of the motor, y refers to a switching state in the inverter corresponding to a phase b of the motor, z refers to a switching state in the inverter corresponding to a phase c of the motor, x, y, z are 1 or 0, respectively, 1 refers to a state where an upper switching element is ON and a lower switching element is OFF among the switching elements comprised in a leg of the corresponding phase, and 0 refers to a state where the upper switching element is OFF and the lower switching element is ON among the switching elements comprised in the leg of the corresponding phase.

16. The motor driving apparatus of claim 15, wherein the controller is configured to control the first switching elements so that the switching state of the first inverter appears in an order of [110], [011], [101], [110], [101], [011], and [110] in the one sampling period.

17. The motor driving apparatus of claim 3, wherein the controller is configured to fix the switching state of the second inverter as [010] in one sampling period, and configured to control the first switching elements so that a switching state of the first inverter appears as [100], [010], and [001] in the one sampling period when the region of the voltage vector is a region where a motor electric angle) corresponds to '$18\pi/12 \leq \alpha < 22\pi/12$', wherein in [xyz], x refers to a switching state in the inverter corresponding to a phase one of the motor, y refers to a switching state in the inverter corresponding to a phase b of the motor, z refers to a switching state in the inverter corresponding to a phase c of the motor, x, y, z are 1 or 0, respectively, 1 refers to a state where an upper switching element is ON and a lower switching element is OFF among the switching elements comprised in a leg of the corresponding phase, and 0 refers to a state where the upper switching element is OFF and the lower switching element is ON among the switching elements comprised in the leg of the corresponding phase.

18. The motor driving apparatus of claim 17, wherein the controller is configured to control the first switching elements so that the switching state of the first inverter appears in an order of [010], [001], [100], [010], [100], [001], and [010] in the one sampling period.

19. The motor driving apparatus of claim 1,
wherein a switching loss of the first switching elements is smaller than a switching loss of the second switching elements.

20. The motor driving apparatus of claim 1,
wherein the first switching elements are a Filed Effect Transistor (FET) based on a SiC material, and the second switching elements is an Insulated-Gate Bipolar Transistor (IGBT) based on a Si material.

* * * * *